United States Patent
Osborn et al.

(10) Patent No.: US 9,433,556 B2
(45) Date of Patent: Sep. 6, 2016

(54) MULTI-VIAL DISPENSING

(75) Inventors: Nigel J Osborn, Amersham (GB); Roger Pettitt, Amersham (GB)

(73) Assignee: GE Healthcare Limited, Buckinghamshire (GB)

( * ) Notice: Subject to any disclaimer, the term of this patent is extended or adjusted under 35 U.S.C. 154(b) by 358 days.

(21) Appl. No.: 13/976,134

(22) PCT Filed: Dec. 30, 2011

(86) PCT No.: PCT/US2011/068115
§ 371 (c)(1),
(2), (4) Date: Jun. 26, 2013

(87) PCT Pub. No.: WO2012/092564
PCT Pub. Date: Jul. 5, 2012

(65) Prior Publication Data
US 2013/0269825 A1   Oct. 17, 2013

Related U.S. Application Data

(60) Provisional application No. 61/428,755, filed on Dec. 30, 2010.

(51) Int. Cl.
*A61J 1/20* (2006.01)
*G21F 5/015* (2006.01)
(Continued)

(52) U.S. Cl.
CPC ............... *A61J 1/20* (2013.01); *A61J 1/2089* (2013.01); *B65B 3/003* (2013.01); *G21F 5/015* (2013.01); *G21G 1/0005* (2013.01); *A61J 1/201* (2015.05); *A61J 1/2017* (2015.05); *A61J 1/2058* (2015.05);

(Continued)

(58) Field of Classification Search
CPC ........ A61J 1/20; A61J 1/2017; A61J 1/2058; A61J 1/2068; A61J 1/2089; A61J 1/201; B65B 3/003; G21G 1/0005; G21F 5/015; Y10T 137/8593
USPC .................. 141/4–5, 99, 237, 242–246, 329; 604/411, 414
See application file for complete search history.

(56) References Cited

U.S. PATENT DOCUMENTS 2,202,163 A   5/1940   Mulford et al.
2,603,396 A   7/1952   Redin et al.
(Continued)

FOREIGN PATENT DOCUMENTS

EP   0542221 A1   5/1993
EP   1747994      1/2007
(Continued)

OTHER PUBLICATIONS

Japanese Office Action regarding Japanese Application No. 2013-547697, dated Nov. 18, 2015, 4 pages.
(Continued)

*Primary Examiner* — Nicolas A Arnett
(74) *Attorney, Agent, or Firm* — Wood IP LLC

(57) ABSTRACT

A multi-vial dispensing cassette provides serial dispensement of radiopharmaceutical fluid into a plurality of dispense vials connected in series. Needle holders may be provided for one or more vials in the cassette and at clip may be incorporated into the needle holder. Each dispense vial has a body and a cap with a fill needle and a withdrawal needle. The withdrawal needle of one vial is connected to the fill needle of an adjacent vial.

16 Claims, 5 Drawing Sheets

(51) Int. Cl.
*G21G 1/00* (2006.01)
*B65B 3/00* (2006.01)

(52) U.S. Cl.
CPC ......... *A61J 1/2068* (2015.05); *Y10T 137/8593* (2015.04)

(56) References Cited

U.S. PATENT DOCUMENTS

| | | | |
|---|---|---|---|
| 3,374,927 | A | 3/1968 | Schmidt |
| 3,527,391 | A | 9/1970 | George |
| 3,868,049 | A | 2/1975 | Johnston |
| 4,085,782 | A | 4/1978 | Carlson |
| 4,964,261 | A | 10/1990 | Benn |
| 2007/0262076 | A1 | 11/2007 | Johnson |
| 2009/0216212 | A1 | 8/2009 | Fangrow, Jr. |
| 2011/0094619 | A1* | 4/2011 | Steel ............... B65B 3/003 141/27 |
| 2013/0041258 | A1* | 2/2013 | Patrick ............... A61B 8/00 600/439 |
| 2013/0079635 | A1* | 3/2013 | Patrick ............... A61B 8/00 600/439 |
| 2013/0220484 | A1* | 8/2013 | De Marco ............ B65B 3/003 141/183 |
| 2013/0225903 | A1* | 8/2013 | Franci ............... B65B 3/003 600/4 |
| 2014/0031751 | A1* | 1/2014 | Patrick ............... A61B 8/00 604/131 |
| 2014/0238542 | A1* | 8/2014 | Kvale ............... A61J 1/1406 141/329 |
| 2015/0297831 | A1* | 10/2015 | Patrick ............... A61B 8/00 604/83 |

FOREIGN PATENT DOCUMENTS

| | | |
|---|---|---|
| EP | 1747994 A | 1/2007 |
| EP | 1860029 | 11/2007 |
| JP | 64-003637 U | 1/1989 |
| JP | 07-112015 A | 5/1995 |
| JP | 2011-512205 A | 4/2011 |
| WO | 95/22954 | 8/1995 |

OTHER PUBLICATIONS

PCT/US2011/068115 ISRWO Dated Aug. 28, 2012.
Chinese First Office Action and Search Report mailed Nov. 2, 2014; 8 pages.
English Translation of Chinese First Office Action and Search Report; 10 pages.

* cited by examiner

MULTI-VIAL DISPENSING

This application is a filing under 35 U.S.C. 371 of international application number PCT/US2011/068115, filed Dec. 30, 2011, which claims priority to U.S. application No. 61/428,755 filed Dec. 30, 2010, the entire disclosure of which is hereby incorporated by reference.

FIELD OF THE INVENTION

The present invention relates to the field of dispensing equipment. More particularly, the present invention is directed to multi-vial dispensing of radiopharmaceuticals.

BACKGROUND OF THE INVENTION

At the end of the radiosynthesis in clinical trial PET manufacturing, the bulk formulation is normally dispensed into three separate vials, the product collected in the first vial to be used for QC, the product collected in the second vial to be used for measurement of sterility and the product collected in the third vial to be used as the patient dose. The present setup at clinical sites is to use a customized dispenser that uses valves and a syringe driver to dispense the required volume according to a pre-programmed sequence. The metering of the product fluid needs to be precise so that requisite amounts of product are provided for each purpose. Additionally, particularly in radiopharmaceutical applications, there is a need to minimize any residual product within the fluid conduits to each dispense vial both to minimize operator exposure to residual activity and to reduce waste of the product fluid.

There is therefore a need for a system and method for dispensing into multiple product vials which provides precise metering of a product fluid and minimizes the occurrence of residual product within fluid delivery lines.

DETAILED DESCRIPTION OF THE PREFERRED EMBODIMENT

A new dispensing process is proposed that allows for simple and rapid dispensing of a radiopharmaceutical without the requirement for special dispensing apparatus. Retro installation at PET manufacturing sites is simplified and very little space is required. Furthermore the process minimizes the amount of the radiotracer lost in the transfer lines. The dispensing principle involves several vials each connected in series via a transfer line with the depth of the syringe needle in the vial defining the dispense volume.

The dispenser delivers the required volume for QC, microbiological and one or more patient samples to a reasonable accuracy and can be used for multiple vials. All the transfer lines between the vials are sucked or blown out as part of the dispensing process, thus minimizing losses within the transfer lines. This is a considerable simplification of the present dispensing apparatus used in clinical sites.

It is contemplated that the present invention may be applicable for other aseptic dispensing situations as well.

Figure 1:
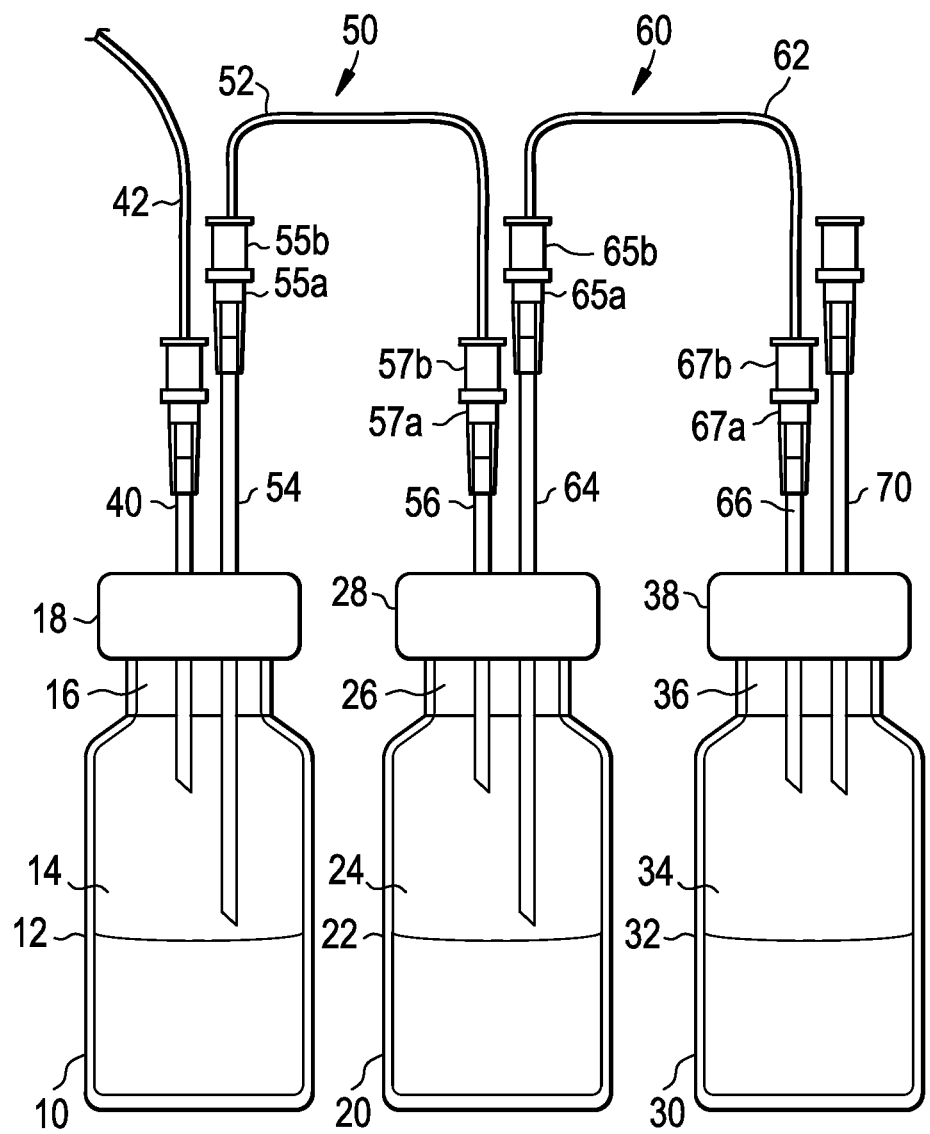
FIG. 1 depicts a series of vials having fill and vent needles inserted into them according to the present invention.

The method and essential components of the present invention are depicted in FIG. 1. The arrangements of the vials and components comprise a cassette of the present invention. A cassette of the present invention is contemplated to provide each of the required components in a single assembly so as to simply the use of those components. A cassette of the present invention may provide some mounting or affixing of components or may simply provide operative connection of the components with each other so as to enable operation in accordance with the present invention. Vials 10, 20, and 30 are provided, each including a vial body 12, 22, and 32 defining a vial cavity 14, 24, and 34 and sealed by an elastomeric septum 16, 26, and 36, respectively. Each of vials 10, 20, and 30 desirably includes a cap 18, 28, and 38, respectively, over its respective septum 16, 26, and 36. A fill needle 40, which is an optional part of the completed cassette of the present invention (although it would be used in dispensing operations), is inserted through septum 16 into vial cavity 14. Fill needle 40 is connected to a fill conduit 42 leading back to a source of product fluid (not shown). A first fluid line 50 spans between vials 10 and 20 and a second fluid line 60 spans between vials 20 and 30. Fluid line 50 includes an elongate hollow conduit 52 supporting a first withdrawal needle 54, inserted through septum 16 into vial cavity 14, and a second fill needle 56, inserted through septum 26 into vial cavity 24. Desirably, each of needles 54 and 56 include female luer connectors 55a and 57a and conduit 52 includes male luer connects 55b and 57b for respective mating thereto. Similarly, fluid line 60 includes an elongate hollow conduit 62 supporting a second withdrawal needle 64, inserted through septum 26 into vial cavity 24, and a third fill needle 66, inserted through septum 36 into vial cavity 34. Desirably, each of needles 64 and 66 include female luer connectors 65a and 67a and conduit 62 includes male luer connects 65b and 67b for respective mating thereto. A vent needle 70 is inserted through septum 36 into vial cavity 34. The present invention contemplates that fill needles 40, 56, and 66 are desirably inserted through their respective septums just enough so as to pass into their respective vial cavities, in order to minimize any product fluid remaining therein after dispensing. Additionally, the present invention contemplates that withdrawal needles 54 and 64 extend through their respective septums a sufficient distance so that their free ends reach down to the fill level for its respective cavity, so that any fluid added above that fill level may be directed through the respective withdrawal needle. Vent needle 70 is simply contemplated to extend through septum 36 a sufficient distance so as to provide venting or drawing therethrough. The cassette of the present invention may also provide shields about each vial, the shields being formed from a radiation-shielding material such as lead or tungsten. The shields may comprise a cylindrical body defining a vial cavity for receiving the vial therein. The shields for each vial may be provided separately or may be provided connected to each other or in the form of a unitary block defining each of the vial cavities.

Referring to FIG. 1, the in-line 0.2 µm filter positioned within, or across the lumen of, fill conduit 42 and the vent filter connected to the end of vent needle 70 extending outside of the vial have been removed for clarity. In operation, a defined volume is transferred in from fill conduit 42 into vial 10. As vial cavity 14 fills up the gas pressure above the liquid also builds up and this will normally vent through fluid line 50 into vial 20 and from there on to vial 30 and ultimately the atmosphere vial vent needle 70. When the liquid goes above the level of the tip of syringe needle 54, the nitrogen can no longer escape and will build up in pressure in vial 10 until enough headspace gas is present to blow over the contents of vial 10 above the tip of needle 54 into vial 20. The process repeats for vial 20 though vial 30 as both needles 54 and 64 are held high enough up the vial cavity 14 and 24, respectively, that no further liquid transfer can occur (assuming the transfer volume doesn't fill vial 30 completely, but this can be controlled by the selection of the vial volumes).

Once all liquid has been transferred to vial 10, the transfer to the second and third vial can be achieved either through continued positive pressure through fill conduit 42 and fill needle 40 or by applying negative pressure from vent needle 70 so as to draw the fluid from vial 10 into and/or through vials 20 and 30.

a) Positive Pressure

Where positive pressure is used, there must be sufficient nitrogen used to effect the transfer of liquid between all 3 vials and this will require an extra blow-out of the vials after the liquid has been dispensed. This is readily achievable using a FASTlab® synthesizer, sold by GE Healthcare of Liege, Belgium (although other automated synthesis or dispense systems may also be used), by opening the nitrogen buffer valve with a positive pressure of nitrogen. Because the whole process relies on gas pressure, fluid lines 50 and 60 are emptied thoroughly, thus maximizing recovery of the radiotracer. Such zero dead volume is not easily achievable with the current generic dispenser system presently used. It is contemplated by the present invention that vent needle 70 may also support, or be connected to, a valve which may be open and closed so as to allow the motive gas to pass therethrough and to prevent the backflow of gas back into vial cavity 34 through vent needle 70. Alternatively, vent needle 70 may be connected to a flexible conduit which may be left undeflected during dispense operations but which may be clamped or clipped closed so as to prevent gas backflow into vial cavity 34. As used herein, a clip or a clamp operates to pinch a deflectable conduit so as to collapse its internal lumen and thus provide a fluid-tight seal.

b) Negative Pressure

Where negative pressure is applied to vial 30, air is sucked out of this vial initially and this then sucks air out of the other two vials in turn taking solution with it. The final point where solution is no longer transferred is the same as for positive pressure and again all the fluid lines 50 and 60 are sucked dry. For example, present invention contemplates that a flexible conduit (not shown) may be connected to vent needle 70 at a location outside of vial 30, and desirably on the far side of the filter from needle 70, so that negative pressure may be applied to vent needle 70 and thus cause the drawing of the product fluid through the vials as described herein.

The whole process should be complete within 30 seconds, a significant time saving over present dispensing apparatus.

Though 3 vials is normally required for clinical sites, with sufficient nitrogen gas pressure or vacuum, the present invention is scalable to dispense into more than three vials serially connected using fluid lines of the present invention.

Prior to separating vials 10, 20 and 30 from their respective fill and withdrawal needles, the present invention further contemplates applying clips, or clamps, to conduits 52 and 62 so as to pinch each closed. With conduits 52 and 62 pinched closed, the threat of contamination through the exposure of one needle of the fluid line while the other is still inserted into its respective vial cavity will be obviated. As will be seen hereinbelow, the clips that are applied may be standard alligator-type clips or may be clips built into either a cassette of the present invention or a needle holder of the present invention which is attached to each vial. Additionally, it is contemplated by the present invention to ensure that vent needle 70 may be blocked so as to prevent outside air from entering into vial cavity 34 therethrough, desirably by blocking any conduit connected thereto. The blocking may be accomplished by applying a clip, or clamp, to a flexible conduit connected to vent needle 70 used for applying a vacuum or conducting a motive gas therethrough. Additionally, a valve may be incorporated into that conduit so as to block backflow of outside gas into vial cavity 34.

The present invention further contemplates that needle holders may be employed to hold the fill and withdrawal needles at each vial. Such needle holders attach to the vials and provide for passage of the needles therethrough so that each needle will be inserted through the vial septum and into the vial cavity. Such needle holders are desirably formed from a suitable polymeric material such as PEEK. These needle holders are also designed for use with specified needles and specified vials so as afford controlled needle insertion depth. Most likely only two types would be required, giving either 3 ml or 10 ml fill in P6 type vials.

Figure 2:
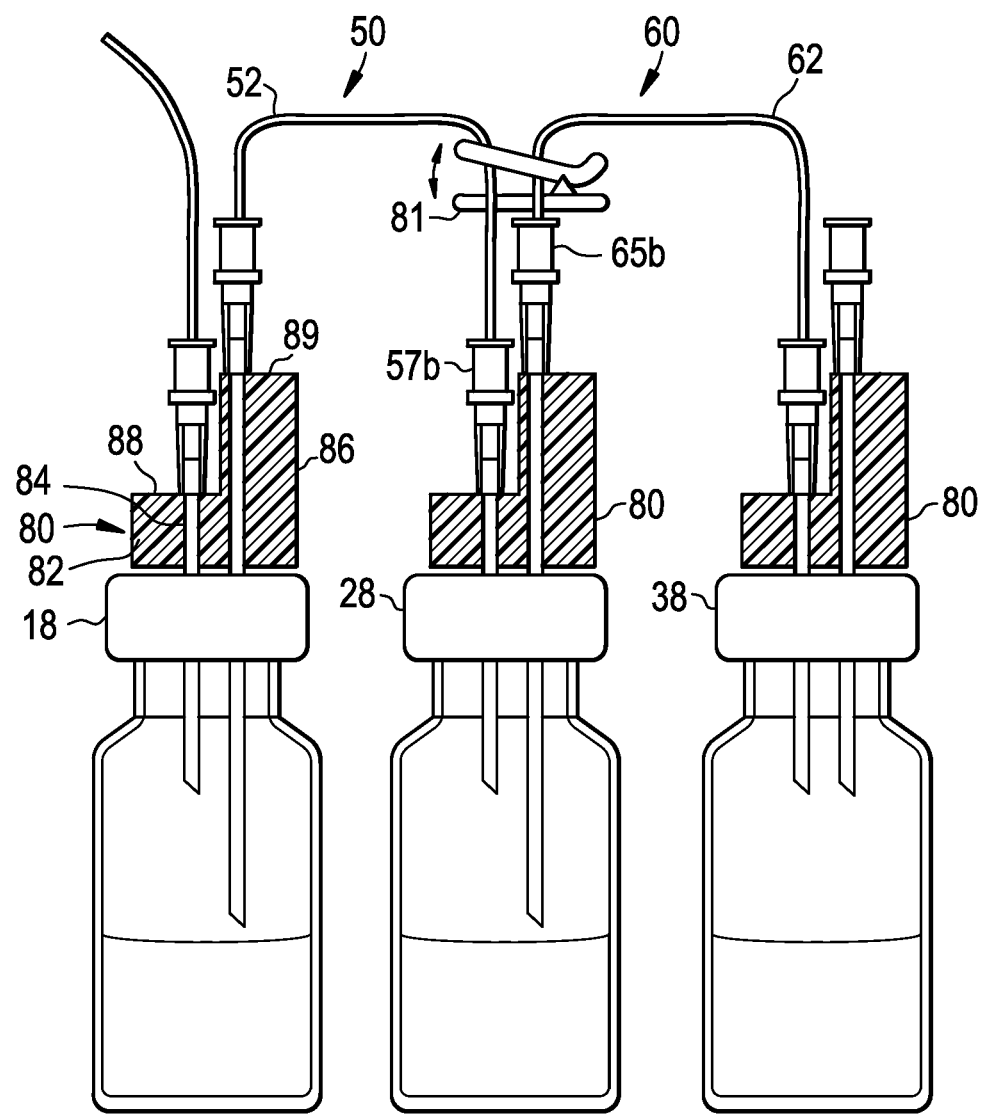
FIG. 2 depicts a multi-vial dispense cassette of the present invention.

Referring now to FIG. 2, the present invention incorporates a needle holder 80 for each of vials 10, 20, and 30 respectively. Needle holder 80 include a holder body 82 which defines first and second open elongate needle passages 84 and 86 therethrough. Needle passages 84 and 86 are located to be in overlying registry with the septums 16, 26, and 36 of their respective vials 10, 20, and 30. Needle holder 80 desirably includes detent means (not shown) to snap onto the vials so that they are removably connected thereto in the proper orientation. The detent means are contemplated to be deflectably mounted on needle holder 80 either by providing the detent means on deflectable tabs or by deforming otherwise stationary detents on needle holder 80. Typically, needle holder 80 would define a cap cavity for retentatively receiving the cap of the vial therein. Moreover, needle holder 80 includes a first needle shoulder surface 88 and a second needle shoulder surface 89 for abutting against the luer connectors of each needle. As the length of each needle and the dimensions of each vial cavity are know, needle holder 80 may be optimized for particular needles and vials to provide a known insertion depth for the needles. The insertion depth of the withdrawal needles (inserted at least as far into the vial cavity as the fill needle) will dictate the minimum volume of fluid remaining behind in each vial. Furthermore, staggering the shoulder surfaces 88 and 89 allows for the two needles to be set more closely together, as any interference between the luer connectors for each will be avoided. Additionally, as shown in FIG. 2, the present invention may employ a single clip 81 across both conduits 52 and 62 at a location proximate to luer connectors 57*b* and 65*b* so as to allow each of fluid lines 50 and 60 to be separated from vials 10, 20, and 30 without risking contamination from the exposed flowpaths thereof.

Figure 3:
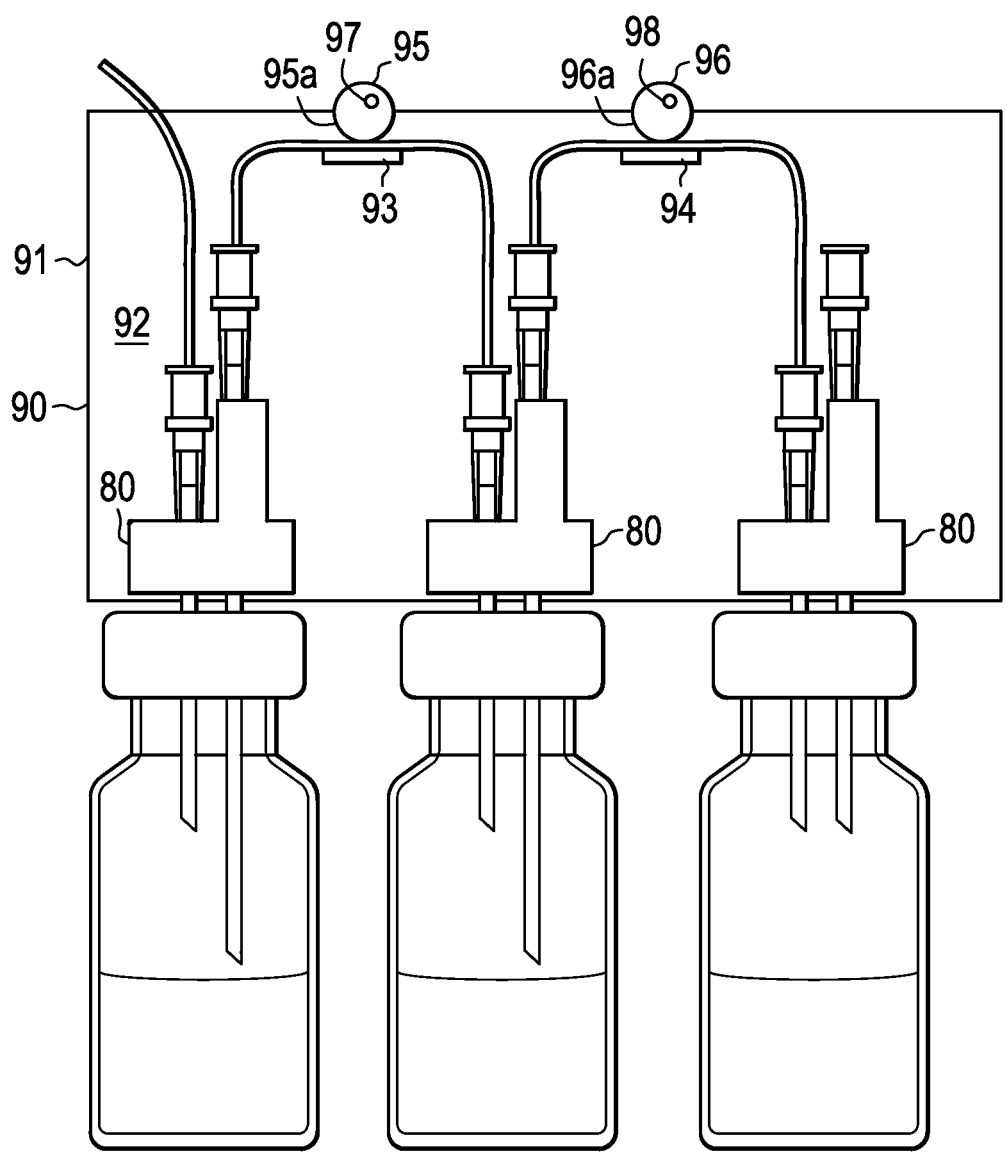
FIG. 3 depicts an alternate multi-vial dispense cassette of the present invention.

Referring now to FIG. 3, the present invention further contemplates providing a mounting base 90 to which each needle holder 80 is attached. Mounting base 90 is shown to be a planar member 91 having a major surface 92 on which the needle holders 80 are affixed. Alternatively, the present invention further contemplates that each needle holder 80 may be held at a fixed spacing by elongate members spanning between adjacent needle holders. Surface 92 supports first and second elongate compression base 93 and 94 along which a portion of conduits 52 and 62, respectively, extend. Additionally, surface 92 supports pivoting cams 95 and 96 above each base 93 and 94. Cams 95 and 96 are designed to be rotatable about their respective axles 97 and 98 so that their perimetrical surfaces 95*a* and 96*a* will pinch conduits 52 and 62, respectively, closed.

Figure 4:
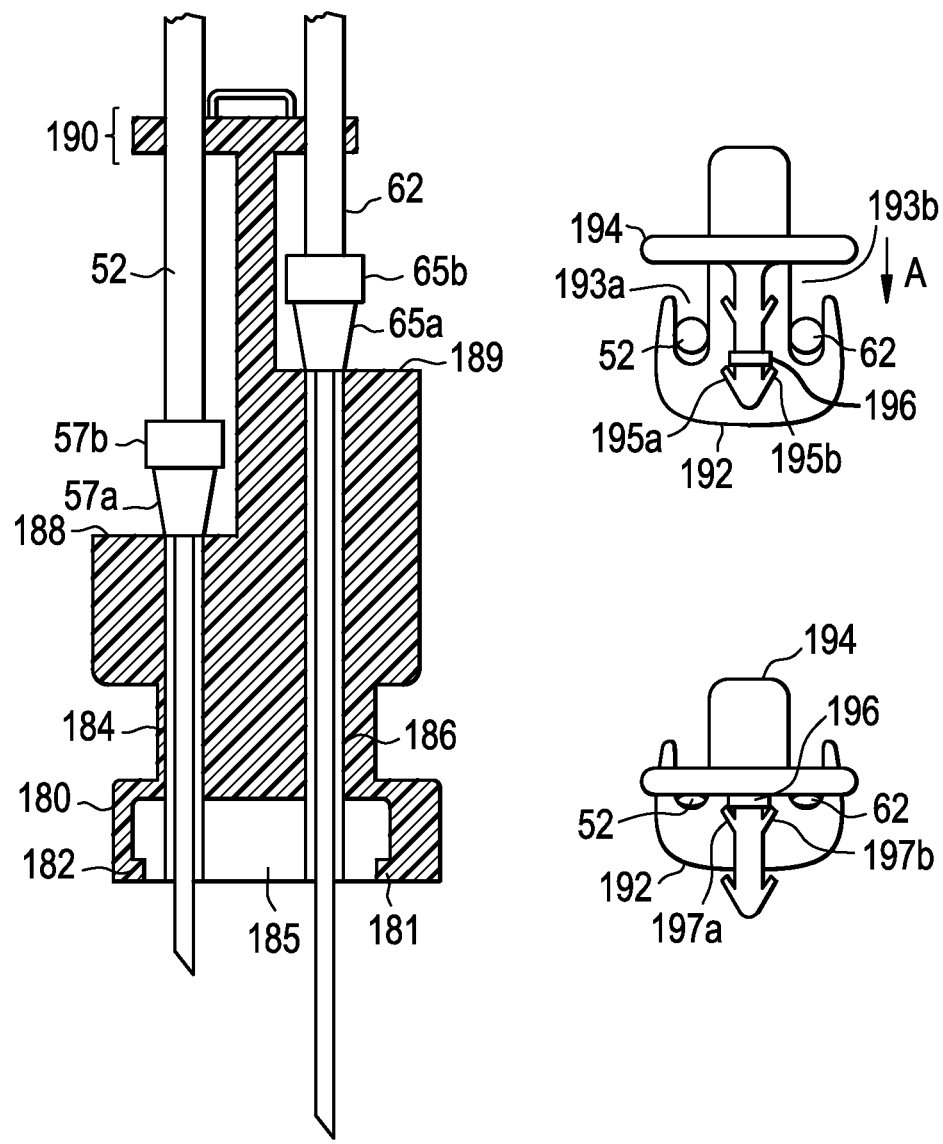
FIG. 4 depicts a needle holder of the present invention.

Referring now to FIG. 4, the present invention further contemplates providing a needle holder 180 incorporating a clip 190 for pinching inserted conduits 52 and 62 closed. Needle holder 180 includes a holder body 182 which defines first and second open elongate needle passages 184 and 186 therethrough. Needle passages 184 and 186 are located to be in overlying registry with the septum the mated vial. Needle holder 180 defines a cap cavity 185 for retentatively receiving the cap of the vial therein. Holder body 182 includes a number of deflectable detents 181 to releasably engage the vial cap. Moreover, needle holder 180 includes a first needle shoulder surface 188 and a second needle shoulder surface 189 for abutting against the luer connectors of each needle. As the length of each needle and the dimensions of each vial cavity are know, needle holder 180 may be optimized for particular needles and vials to provide a known insertion depth for the needles. The insertion depth of the withdrawal needles (inserted at least as far into the vial cavity as the fill needle) will dictate the minimum volume of fluid remaining behind in each vial. Furthermore, staggering the shoulder surfaces 188 and 189 allows for the two needles to be set more closely together, as any interference between the luer connectors for each will be avoided.

Clip 190 of needle holder 180 sits atop body 182. A cradle 192 defines conduit receiving recesses 193*a* and 193*b* open to receive conduits 52 and 62 therein, respectively. A locking clip 194 is slideable across the top of cradle 192 from a first position allowing fluid to flow through each conduit to a second position in which the clip is caused to compress conduits 52 and 62 against cradle 192 so as to pinch each closed. Clip 194 includes a first pair of detents 195*a* and 195*b* extending through locking head 196. Second pair of detents 197*a* and 197*b* extend from clip 194 and are insertable through head 196 until reaching the other side where each springs back to hold clip 194 in a position which pinches conduits 52 and 62. The present invention further contemplates that clip 190 additionally includes a depending hook. The hook is connected to locking clip 194 and positively engages either the cap or vial on which clip 190 is positioned while locking clip is in the first position and is moved clear of the cap or vial while locking clip is the second position. The hook will thus ensure that the vial cannot be removed from the conduits until the conduits for each needle are sealed by locking clip 194.

The present invention further contemplates employing a needle-less connection among the vials. Each of the vials may include a cap which provides inlet and outlet ports in fluid communication with the vial cavity. The inlet and outlet ports may further include valves which may be connected to conduit lines. The outlet port is further connected in fluid communication to an elongate hollow withdrawal conduit extending into the vial cavity a known distance. Each of the vials may then be placed in fluid communication with each other between a fill conduit and a vent conduit. Dispensing into the vials would be by the method of the present invention of driving fluid from one vial to the next based on the insertion depth of the withdrawal conduit extending to the outlet port of the cap.

Application at Clinical PET Sites

Figure 5:
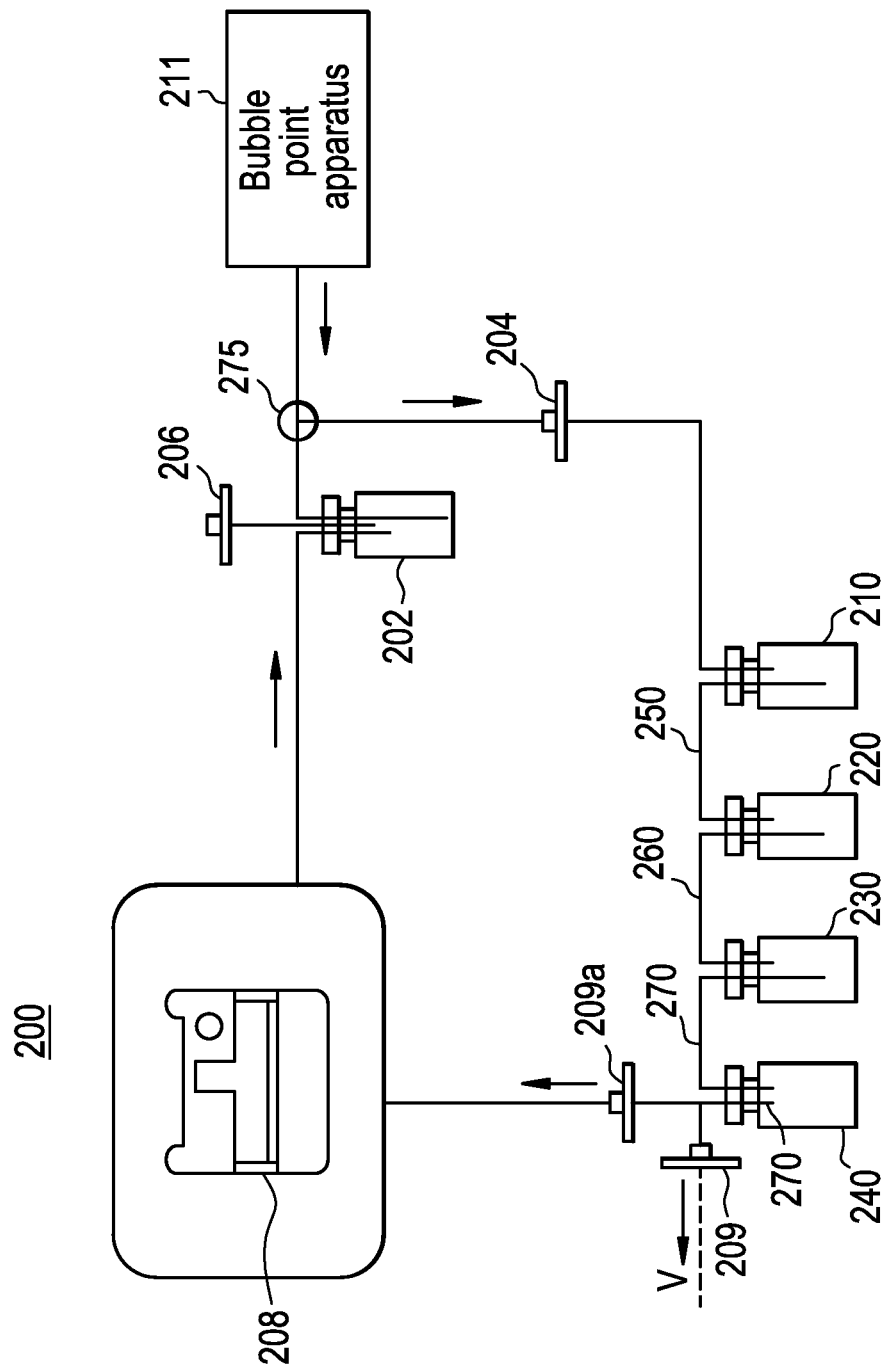
FIG. 5 depicts a series of vials connected to a synthesis device according to the present invention.

Referring now to FIG. 5, a system 200 for multi-vial dispensing is shown. The exact setup at PET centers is slightly complicated by the need to initially dispense into a bulk vial 202 to ensure uniform homogeneity of the product and from there to dispense via an aseptic 0.2 μm filter 204 to the dispense vials. System 200 dispenses into four dispense vials 210, 220, 230, and 240, the total volume being typically 25 to 50 ml. by using fluid lines 250, 260, and 270, each being similar to fluid lines 50 and 60. Vial 210 is used to collect a sample of the product fluid for QC testing, vials 220 and 230 are used to collect patient doses, and vial 240 is used to collect a sample of the product fluid for sterility testing. As the volumes indicated in FIG. 5 demonstrate, the present invention is able to serially dispense into vials of varying volumes. Once wetted the aseptic filter 204 cannot easily pass air to pressurize the vials and thus an alternative mechanism (e.g. negative pressure transfer as above) may be used to provide the driving force for forcing solution through the vials. The initial mixing also requires a disposable filter 206 present in the bulk vial with low enough resistance to flow of gas that no significant gas pressure can build up and potentially cause solution to pass over to vial 210.

Desirably, the transfer between the vials is effected by negative pressure from either an external vacuum source or the vacuum incorporated into a FASTlab synthesizer 208. The initial transfer and mixing occurs in to the pre-filled bulk vial 202 with vent 206 present to stop any build-up of gas pressure that may cause the fluid to transfer to the QC vial 210. Once this is filled, a vacuum is applied to the vent needle 270 at vial 240 which sucks air through from the vent through the 0.22 μm aseptic filter 209 in the direction indicated by arrow V. Alternatively, synthesizer 208 may provide the negative pressure through a conduit connected between it and asceptic filter 209*a* which also is in fluid communication with the cavity of vial 240. Once air enters the aseptic filter 204, no further flow of solution can occur and a negative pressure starts building up in the dispensed vials effecting transfer of solution. The transfer line between the aseptic filter 204 and vial 210 will remain full of solution since no gas can easily pass through the filter. However, each subsequent transfer line will be emptied as the pressures equalizes between the vials. The conduit lines spanning between the vials are desirably clamped so as to seal the lumens of each conduit prior to removing the needles from their respective vials, ensuring sterility of the vial contents.

It is important that the pressure differential across the aseptic 0.22 μm 204 filter is not great enough to cause rupturing of the membrane.

Once all the samples are dispensed it is necessary to test the integrity of the aseptic filter 204 and this can be done through a proprietary bubble point apparatus 211 connected above it or possibly by applying increasing pressure to the filter and observing when air is forced through the filter. The QC vial 210 is desirably disconnected for this latter option to prevent any chance of contamination.

The cassette of the present invention may be assembled for dispensing into multiple vials using a fluid line spanning between successive vials. Each vial includes a vial body defining a vial cavity and is sealed by an elastomeric septum. Each fluid line includes an elongate conduit supporting an elongate needle at each end thereof, a withdrawal needle at the first end and a fill needle at the opposed second end. The cassette may be assembled by the steps of first inserting a first fill needle into a first vial, then inserting the free end of a first withdrawal needle of a first fluid line into the first vial, whereby the free end of the first withdrawal needle of the first fluid line extends at least as low into said vial cavity of the first vial as the first fill needle. A second fill needle connected at the opposite end of the first fluid line from the first withdrawal needle is inserted into a second vial such that its free end extends through the elastomeric septum of the vial and into the vial cavity of the second vial. A second withdrawal needle supported at the first end of a second fluid line is inserted into the second vial such that the free end thereof extends through the elastomeric septum of the second vial and into the vial cavity. The second withdrawal needle of said second fluid line extends at least as low into the vial cavity of the second vial as the second fill needle of the first fluid line. A third fill needle affixed to the opposite end of the second fluid line from the second withdrawal needle is inserted into a third vial such that the free end thereof extends through the septum of the third vial and into the vial cavity of the third vial. A vent needle is inserted into the third vial such that the free end thereof extends through the elastomeric septum of the third vial and into the vial cavity thereof. With the cassette assembled, the vent needle will be in fluid communication with the first vial cavity. The cassette may also be provided in kit form, providing the vials, needles, conduit lines, and vent adapted for assembly. Desirably, the kit of the present invention provides the fill and withdrawal needles sealingly connected to their respective conduits.

For dispensing operations, the first fill needle is placed in fluid communication with a source of product fluid to be dispensed, such that the product fluid may be directed through the fill needle into the first vial. The product fluid from the fluid source is then directed through the first fill needle into said first vial, at least some of the fluid being further directed through said first fluid line to said second vial and through said second fluid line to said third vial. The motive force for directing the fluid into each vial may be a positive pressure acting on the fluid source or a negative pressure acting through the vent needle (or otherwise through the third vial).

The present invention contemplates that the insertion of the first fill needle and the vent needle may occur last, such that the cassette of the present invention is otherwise assembled. This cassette may be assembled just prior to dispense operations, or it may be assembled long before dispense operations, the typical limitation being the ability of the septums to re-seal once the fill and withdrawal or vent needles are removed.

The present invention contemplates that the free ends of the needles may be positioned either partway into the septums such that they do not penetrate into the respective vial cavity but do not expose the needle lumens to the atmosphere or that the free ends of the needles may themselves be capped by an elastomeric plug which may be positioned in contact with the respective vial septum so that the needle may push through both the plug and the septum (ie, without removing the plug and exposing the needle lumen) when penetrating into the vial cavity. In this manner, the cassette of the present invention may be assembled in a clean or sterile environment and the sterility of the fluid-contacting surfaces of the needles, conduits and vials may maintain sterility regardless of the outside environmental conditions.

Additionally, the present invention provides a method of dispensing into multiple vials using a number of fluid lines, where each vial includes a vial body defining a vial cavity and sealed by cap which includes an inlet port and an outlet port through which fluid may be provided into and out of said vial cavity, respectively. The inlet port is in fluid communication with a fill conduit extending into its respective vial cavity and the outlet port is in fluid communication with a withdrawal conduit extending at least as low into the vial cavity of the first vial as the fill conduit. Each fluid line includes an elongate conduit supporting a first connector at one end for connection to the out port of a vial and a second connector at the opposite end for connection to the inlet port of a vial. The method includes the steps of connecting a fill conduit to an inlet port of a first vial, connecting the first connector of a first fluid line to an outlet port of the first vial, connecting the second connector of the first fluid line to an inlet port of a second vial, connecting the first connector of a second fluid line to the outlet port of the second vial, connecting the second connector of the second fluid line to an inlet port of a third vial, connecting a vent conduit to the outlet port of the third vial, directing a fluid from a fluid source through the fill conduit into the first vial, at least some of the fluid being further directed through the first fluid line to the second vial and through the second fluid line to the third vial. The directing step may also include the step of applying a motive force to the fluid source so as to direct the fluid into the fill conduit. The motive force may be either a positive pressure applied to the fluid source to direct fluid to the fill conduit or a negative pressure applied through the third vial so as to draw the fluid from the fluid source to each vial.

The present invention further provides a method of forming a multi-vial dispense cassette which may be used to dispense a product fluid to a number of serially-connected vials, wherein each vial includes a vial body defining a vial cavity and is closed by an elastomeric septum. The cassette includes a first fluid line for extending in fluid communication between the vial cavities of a first and second vial, the first fluid line including an elongate hollow conduit supporting an elongate hollow needle at each end thereof. The cassette also includes a second fluid line for extending in fluid communication between the vial cavities of the second vial and a third vial, the second fluid line including an elongate hollow conduit supporting an elongate hollow needle at each end thereof. The cassette provides for a vent needle to be insertable into the vial cavity of third vial, the vent needle being connectable to, or including, a filter so as to protect the contents of the vials from contamination. Additionally, the dispense cassette allows a fill needle to be insertable into the vial cavity of the first vial, the fill needle being connected to a source of product fluid. The present invention also contemplates that the each of the needles provided are sealed by a pierceable cap, possible formed of an elastomeric material. Each needle may be inserted through its pierceable cap and into the septum of its respective vial so as to maintain the sterility of the fluid path to be seen by a product fluid dispensed into the vials.

The present invention further contemplates that the cassette and the fill needle and vent needles may be provided in kit form to be assembled by a user prior to dispensing. The cassette may come in either an assembled or unassembled configuration, such that each of the parts are adaptable to be connected together so as to form the dispense cassette. The kit may further include the vent needle and fill needle to be used for a dispensing operation, although the fill needle and/or the vent needle may be provided by a dispensing system to which the cassette attaches.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A multi-vial dispensing cassette, wherein each vial includes a vial body defining a vial cavity and is closed by an elastomeric septum, said cassette comprising:
   a first fluid line for extending in fluid communication between the vial cavities of a first and second vial, said first fluid line comprising an elongate hollow conduit supporting an elongate hollow needle at each end thereof;
   a second fluid line for extending in fluid communication between the vial cavities of the second vial and a third vial, said second fluid line comprising an elongate hollow conduit supporting an elongate hollow needle at each end thereof; and
   a vent needle insertable into the vial cavity of third vial, said vent needle being connected to a filter so as to protect the contents of the vials from contamination;
   wherein a fill needle is insertable into the vial cavity of the first vial, the fill needle being connected to a source of product fluid.

2. A multi-vial dispensing cassette of claim 1, further comprising a clamp for pinching closed at least one of the conduits of the first and second fluid line.

3. A multi-vial dispensing cassette of claim 2, wherein clamp actuation allows the vials to be removed from the cassette.

4. A multi-vial dispensing cassette of claim 1, further comprising a clamp pinching both the conduits of the first and second fluid line closed.

5. A multi-vial dispensing cassette of claim 1, further comprising a needle holder for engaging each vial, each said needle holder including passageways therethrough for each needle to guide a tip of each needle through the septum of the connected vial.

6. A multi-vial dispensing cassette of claim 5, wherein each needle holder allows its associated withdrawal needle to extend at least as low within a vial cavity as its associated fill needle.

7. A multi-vial dispensing cassette of claim 5, wherein said needle holder further comprising a pair of deflectable detent arms for releasably engaging the vial.

8. A multi-vial dispensing cassette of claim 1, further comprising shields for each vial, each shield being disconnectably connected to the cassette.

9. A multi-vial dispensing cassette of claim 8, wherein each shield is mechanically linked to the vial clamps, such that the vial clamps must be in the closed position about their respective fluid conduits to allow disconnection of the shields from the cassette.

10. A multi-vial dispensing cassette of claim 1, further comprising a vial connection system which holds vials at an extended position wherein no needles penetrate into the vial cavities, and at a retracted position wherein the needles penetrate through the respective vial.

11. A multi-vial dispensing cassette of claim 10, wherein each needle is capped by an elastomeric plug in the extended position.

12. A method of dispensing into multiple vials using a number of fluid lines, each vial including a vial body defining a vial cavity and sealed by an elastomeric septum and each fluid line comprising an elongate conduit supporting an elongate needle at each end thereof, comprising the steps of:
   inserting a first fill needle into a first vial;
   inserting the free end of a first withdrawal needle of a first fluid line into said first vial, said free end of said first withdrawal needle of said first fluid line extending at least as low into said vial cavity of said first vial as said first fill needle;
   inserting a second fill needle of said first fluid line into a second vial;
   inserting a second withdrawal needle of a second fluid line into said second vial, said second withdrawal needle of said second fluid line extending at least as low into said vial cavity of said second vial as second fill needle of said first fluid line;
   inserting a third fill needle of said second fluid line into a third vial;
   inserting a vent needle into said third vial, said vent needle being in fluid communication with said fill needle inserted into said first vial; and
   directing a fluid from a fluid source through said fill needle into said first vial, at least some of the fluid being further directed through said first fluid line to said second vial and through said second fluid line to said third vial.

13. A method of dispensing into multiple vials of claim 12, wherein said vent needle extends no lower into said vial cavity of said third vial as said second needle of said second fluid line.

14. A method of dispensing into multiple vials of claim 12, wherein said directing step further comprises the step of applying a motive force to said fluid source to direct the fluid into said fill needle.

15. A method of dispensing into multiple vials of claim 12, wherein said directing step further comprising the step of applying a low pressure to said vent needle to draw fluid through said first fill needle into said first vial.

16. A method of dispensing into a multi-vial cassette of claim 1, comprising the steps of:
   inserting a first fill needle into a first vial, the first fill needle being in connected to a source of product fluid;
   inserting a vent needle into said third vial, said vent needle being in fluid communication with said fill needle inserted into said first vial; and
   directing the product fluid through the first fill needle, and into the first, second and third vials.

* * * * *